Jan. 19, 1971 MASAHIKO INOUE 3,555,631
BUCKLE DEVICE OF SAFETY BELT
Filed March 25, 1969 3 Sheets-Sheet 1
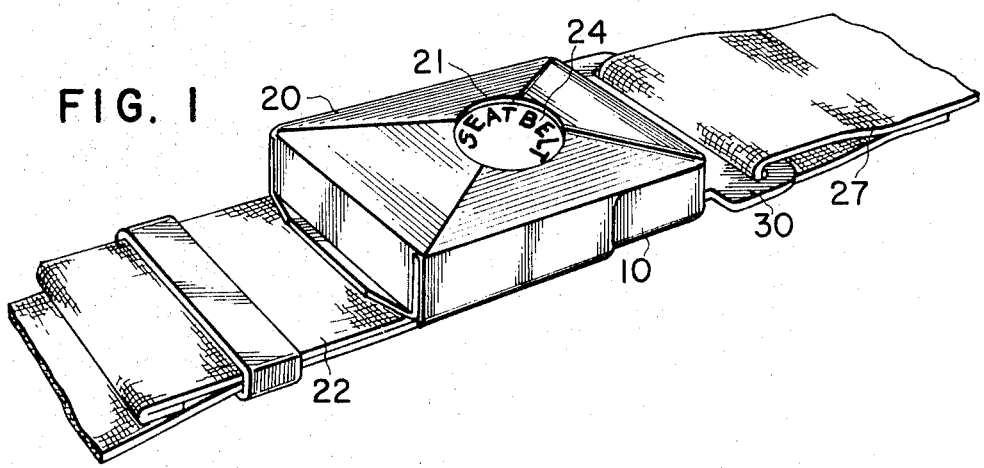
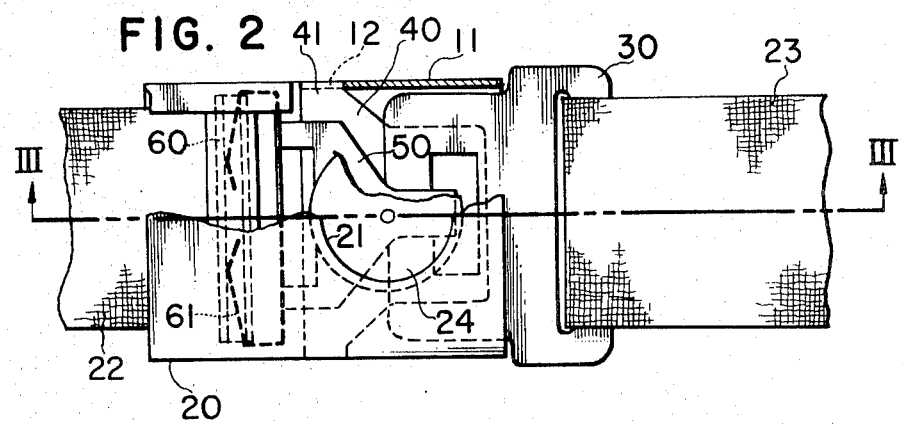
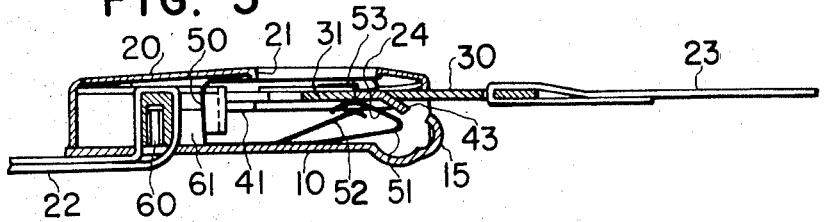
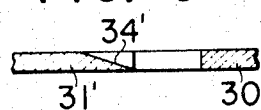
INVENTOR
BY
ATTORNEY Jan. 19, 1971 MASAHIKO INOUE 3,555,631
BUCKLE DEVICE OF SAFETY BELT
Filed March 25, 1969 3 Sheets-Sheet 2
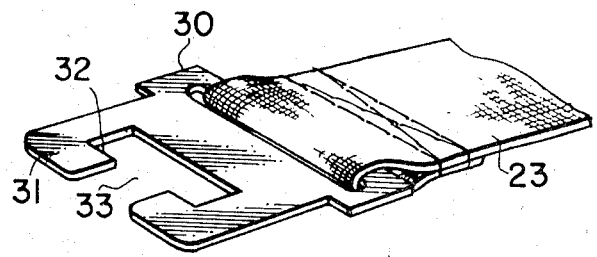
FIG. 4
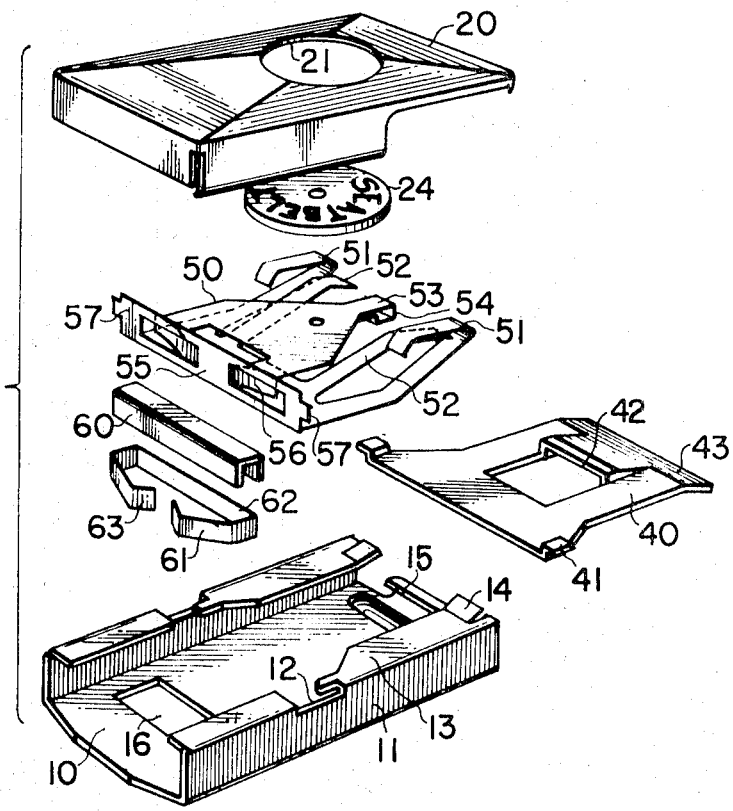
FIG. 5
FIG. 10
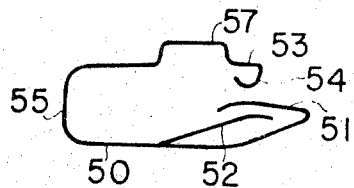
INVENTOR
BY
ATTORNEY Jan. 19, 1971  MASAHIKO INOUE  3,555,631
BUCKLE DEVICE OF SAFETY BELT
Filed March 25, 1969  3 Sheets-Sheet 3

Masahiko Inoue
INVENTOR

BY George B. Oujeroth
ATTORNEY 3,555,631
BUCKLE DEVICE OF SAFETY BELT
Masahiko Inoue, Toyota-shi, Japan, assignor to Toyota Jidosha Kogyo Kabushiki Kaisha, Toyota-cho, Toyota-shi, Aichi-ken, Japan, a corporation of Japan
Filed Mar. 25, 1969, Ser. No. 810,236
Claims priority, application Japan, May 11, 1968, 43/31,217
Int. Cl. A44b 11/26
U.S. Cl. 24—230                6 Claims

ABSTRACT OF THE DISCLOSURE

A safety belt buckle device with a flat latch member having an engageable opening which enters a case with an end opening to receive the latch member and a top opening for a push button. Contained in the case is a latch plate with one plate end rotatably supported by the case and the other end having a cam-like projection for engagement with the engageable opening of the latch member. Disposed around the latch member is a spring means having a first spring biasing the entering latch member to the locking position, a second spring biasing the latch plate to a locking position and a third spring with a spring projection passing through said top opening. This third spring includes push button means which will unlock the cam-like projection from the engageable opening.

BACKGROUND OF THE INVENTION

The present invention relates to a buckle device used for attaching a safety belt of a car about a human body, particularly a buckle device of a safety belt which is unlocked by a push-button.

Generally, at the time of a head-on collision between cars or a sudden stopping of a car, a very large deceleration is added to the car body and thereby the occupant of the seat is thrown outwards forwardly with an inertia of several tens of G so that the breast or forehead is knocked against a handle, a panel or glass which is in front of the occupant of the seat thus causing an accident. In order to reduce such risk, a safety belt is used by means of which the occupant of the seat is fastened to the seat so that he is prevented from being thrown out at the time of collision, or short stop.

Among the safety belts of this kind, there are a level buckle device and a push-button buckle device with which the present invention is concerned. But in the former type buckle device, a hook with which a latch member is fastened and a lever holding this hook are subjected to a force in the unlocking direction due to an inertia at the time of a collision, or short stop and thus there is a fear that unintentional unlocking will occur. In contrast to the lever system, in the push-button buckle device, there can be adopted a construction such that locking is securely made under any condition without being affected by the inertia as mentioned previously.

Thus, the object of the present invention is to provide a buckle device of a safety belt in which unlocking does not occur due to inertia and there can be provided a buckle device for a safety belt which is simple in construction and can be cheaply made and in which unlocking can securely, simply be made by pressing the push button.

Accordingly, the present invention provides for a safety belt buckle device wherein a flat latch member having an engageable opening enters a case with an end opening to receive the latch member and a top opening for a push button. Contained in the case is a latch plate with one plate end rotatably supported by the case and the other end having a cam-like projection for engagement with the engageable opening of the latch member. Disposed around the latch member is a spring means having a first spring biasing the entering latch member to the locking position, a second spring biasing the latch plate to a locking position and a third spring with a spring projection passing through said top opening. This third spring includes push button means which will unlock the spring projection from the engageable opening.

Support means for the latch plate can be readily obtained by forming a pivot piece made of projections on both sides of the end portion of said plate and by mounting this pivot piece on a notch provided at the upper part of the side wall of the case and by covering it with the cover. The end of the latch plate towards the case open end in which the latch member is inserted, is preferably tapered downward so that it may be automatically pushed down by the insertion of the latch member.

A push button exposed to the opening of the cover may be formed with a metal piece or casting resin or integrally with an unlocking spring which is on the lower face of the push button. If the mounting rod in the case cover on which one end of the safety belt is wound, is provided with a little adjusting tolerance for the adjustment of a length of the belt, an unpleasant rattling sometimes occurs at the time of its use. Therefore, it is preferable to hold this mounting rod in a position of deflection corresponding to that at the time of tension of the belt by means of a spring.

The invention as well as other objects and advantages thereof will be more apparent from the following detailed description taken in conjunction with the accompanying drawing, in which:

BRIEF DESCRIPTION OF DRAWINGS

FIG. 1 is an external perspective view of a buckle device according to the present invention;

FIG. 2 is a plan view of the buckle device showing a partial section;

FIG. 3 is a longitudinal sectional view taken along the line III—III of FIG. 2;

FIG. 4 is a persective view of a latch member;

FIG. 5 is an exploded view of a case cover and parts to be received in the case cover;

FIG. 9 is a sectional view taken along the line IX—IX of FIG. 8; and,

FIGS. 10 and 11 are schematic views showing another embodiment of a lock spring which is used for the buckle device according to the present invention.

DETAILED DESCRIPTION

Figure 6:
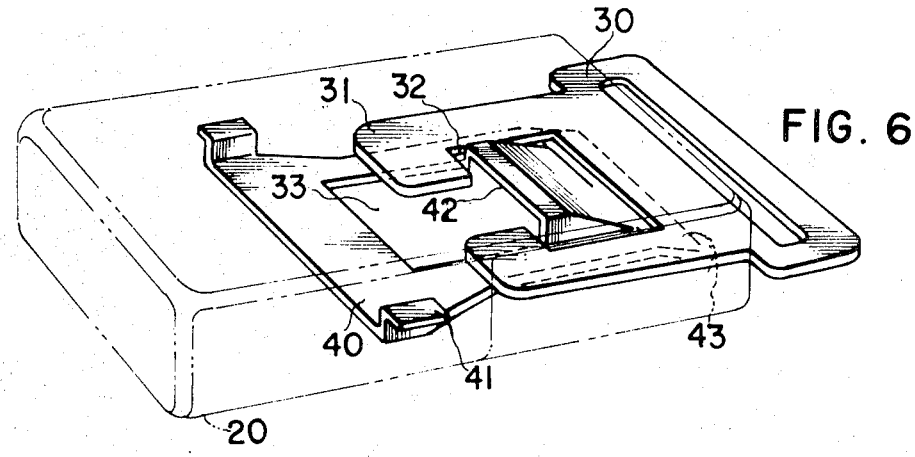
FIG. 6 is a persective view highlighting an essential part with a solid line for illustrating the work of the buckle device according to the present invention.

In the drawings, there is shown a push-button type of the present invention. There is a case 10, a cover 20 by which this case is covered and a latch member 30 which is inserted in the opening of the end of this case 10, as shown in the external perspective view of FIG. 1, and in the case 10, there is mounted one end 22 of the safety belt whose length is freely adjustable and which is wound on the mounting rod as will be explained later. The other end 23 of the safety belt is mounted on the latch member 30. An opneing 21 is bored in the front of the cover 20 and a push-button 24 for unlocking is exposed in the opening.

With reference to a plan view partly in section of FIG.

2, a longitudinal sectional view of FIG. 3 and a view of parts in disassembled state of FIG. 5, explanation will be made about the parts to be received in the case 10, and cover 20. A pivot piece 41 integrally formed on both sides of the end portion of a latch plate 40 is mounted on a notch 12 which is provided on the upper part of the side wall 11 of the case 10 and the plate 40 is supported so that it may be freely rotated forward and backward. In this case, the front means the cover 20 side, namely, the upper part in FIG. 3 and the rear means the case 10 side, namely, the lower part in FIG. 3. Near the extreme end of the latch plate 40, an engaging projection 42 is formed by press and further a tapered face 43 directed rearward is formed.

A spring member 50 whose section is C-shaped, is contained in the case 10 so as to surround this latch plate 40 from the left side of the drawing and this spring member 50 comprises a spring pair 51 holding the latch member 30 in a pressed state, a spring pair 52 holding the latch plate 40 in a pressed state and a spring 53 butting on the front of the engaging projection 42 of the latch plate 40. A projection 54 is integrally formed at the extreme end of the spring 53. At the leg part 55 to which these springs 51, 52, 53 are integrally connected, two tongues 56 which are punched, are pushed out in the right direction of the drawing and the tongues 56 press the end face of the latch plate 40 in the right direction and stops the rattling of the pivot piece 41 in the notch 12 in the state that these spring member 50 and latch plate 40 are contained in the case 10 and cover 20. Small pieces 57 project on both sides of the leg part are inserted in the notch 12 together with the pivot piece 41 and movement of the spring member 50 is prevented.

A front guide plate 13 for the latch member 30 and a taper piece 14 for providing a smooth path for the insertion of the latch member 30 in the extreme end of the opening side are provided integrally with the side wall 11 of the case 10 and a projection 15 for controlling the rotation of the latch member 40 which is in the state of locking at the time of use is provided at the bottom. An opening 16 at the bottom of the case 10 is used for guiding one end 22 of a safety belt into the case 10, and the safety belt 22 is half wound on a mounting rod 60 in U-shaped section through this opening 16 and is pulled out to the outside and is fastened by a suitable binding means. A C-shaped spring 61 serves for holding said mounting rod 60 in the state of pressing it to the left side of the drawing and a leg part 62 of said rod 60 is in contact with the back of the leg part 55 of the spring member 50 and two opposed legs 63 are within the mounting rod 60 in U-shaped section and press the inner wall of its left side. Further, the length of the mounting rod 60 is longer than that of the opening 16 and is not unlocked from the case 10 at the time of use.

Figure 7:
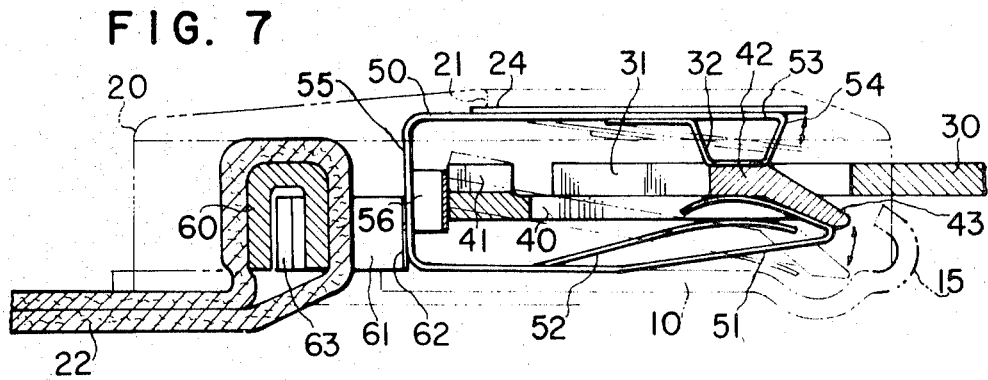
FIG. 7 is a longitudinal sectional view highlighting an essential part with a solid line for illustrating the work of the buckle device according to the present invention.

In FIGS. 2 and 3, the latch member 30 is inserted in the case cover 10, 20 from the opening of its end portion and as evident in FIG. 4, the latch member 30 is provided with two opposed engaging pieces 31 so that an engaging opening 32 may be formed and a clearance 33 remains between said two pieces 31. The engaged state of the latch member 30 and the latch plate 40 and its unlocking action is explained with reference to FIGS. 6 and 7 as follows:

In FIG. 6, the latch plate 40 is indicated by solid line and the latch member 30 is in contact with the front or the upper surface of this plate and an engaging projection 42 of the latch plate 40 is fitted in the engaging opening 32 of the latch member. The spring pair 51 which is on the outside of the spring member 50 already mentioned in FIG. 5 presses forward the latch member 30 as shown in FIG. 7 and brings this latch member into contact with the inside of the guide plate 13 of the case 10. The interval of this spring pair 51 is broader than the lateral length of the latch plate 40 and in consequence, regardless of the rearward rotation of the latch plate 40, the spring pair 51 always holds the latch member 30 at the position indicated by the drawing.

The spring pair 52 which is on the inner side holds the latch plate 40 to the front from the rear in the pressed state, namely, so that said plate may make contact with the latch member 30 and in the usual state, the latch member 30 is perfectly locked. The spring 53 having the projection 54 in butting engagement with the engaging projection 42 of the latch plate 40 from the front, is provided with a style plate or push button 24 for pushing on the opening 21 side of the cover 20 in the front of said spring 53 and the engaging projection 42 is pushed down by pushing this plate 24 from the outside through the projection 54 of the spring 53 as indicated by dotted line and the latch plate 40 is rotated rearward centering around the pivot piece 41. Since the height of the projection 54 is larger than the thickness of the latch member 30, engagement of the engaging projection 42 and the engaging opening 32 is unlocked in the state indicated by dotted line in the drawing and the latch member 30 is pulled out to the right side. In this case, the lateral length of projection 54 of spring 53 is narrower than the width of the clearance 33 of the latch member 30 and therefore the latch member 30 is pulled out without hitting the engaging pieces 31 on the projection 54.

At the time of use of a safety belt, when a large inertia acts on an occupant of the seat and a buckle device, the latch member 30 is always in contact with the inner side of the guide plate 13 of the case 10 and against the latch plate 40, this inertia acts in the direction of securing the engagement and therefore there is no fear that the latch member 30 is suddenly unlocked. Actually, the direction of tension of the belt is more or less inclined rearward but the latch member 30 and the latch plate 40 are only slightly rotated in the state of the engagement and moreover the rotating angle is limited by the projection 15 of the opening portion provided on the end to receive said latch member 30 insertion in the second opening of said case; a latch plate 40 contained in said case 10 with one end 41 rotatably supported by said case and the other end has a projection 42 for engagement with an opening in a latch member at a rotating position towards the front; and spring means disposed around said latch plate having a first spring 51 holding said latch member 30 in the state of pressing, a second spring 52 holding said latch plate 40 at the locking position an a third spring 53 which has a projection butted on the front of said latch plate 40 and which is pushed through the first opening 21 of said case cover and thereby said latch plate is turned to the release position and which makes the engaging projection 42 of said latch plate unlock from the engaging opening 32 of said latch member; and said spring member being integrally formed with said three springs within said case cover, on the bottom of the case 10 and therefore there is also no fear that unlocking by such inclination arises.

Figure 8:
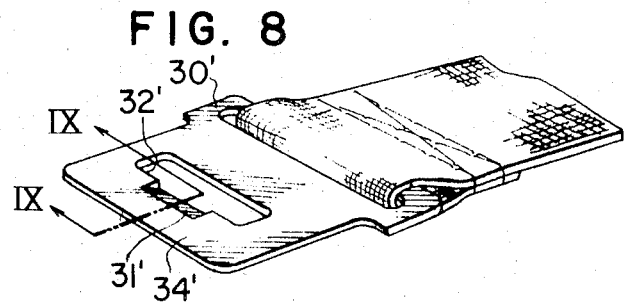
FIG. 8 is a persective view showing another embodiment of the latch member.

FIGS. 8 and 9 show another embodiment of the latch member and a latch member 30' having an engaging opening 32' which presents a loop shape with a leg portion 31' closed. Also, a tapered face 34' is formed instead of clearance 33. Consequently, in FIG. 7, on the occasion of pushing the engaging spring 53, if the latch member 30' is pulled out to the right side of position of the dotted line of the projection 54, the projection 54 is pushed up by the action of the tapered face 34' and thus the pulling out of the latch member is made possible.

Figure 11:
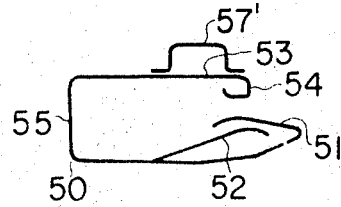

FIGS. 10 and 11 show another embodiment of the spring member, particularly with regards to the construction of the push button, a press projection 57 is integrally formed at the portion of the spring 53 instead of using a style plate or a push button 24 separately mounted as mentioned previously. This projection 57 is guided to the opening 21 on the front of the cover 20 operation from the outside is easy. And in FIG. 11, a metal piece is made into a push button 57' by press forming and this push button is mounted on the upper face of the spring 53.

It is to be observed therefore that the present invention provides for a buckle device for a safety belt to fasten a car occupant to the vehicle seat or body. First, there is a flat latch member 30 fastened at one end to the end of a safety belt and having an engagable opening 32 at the other end. This latch member fits into a case 10 with a case cover 20 attached to the other end of the safety belt, with a top opening 21 on the front of the case cover and a receiving opening provided on the end disposed to receive the latch member 30. Within the case 10 is a latch plate 40 with one plate end 41 rotatably supported by the case and the other end having a cam-like projection 42 for engagement with the latch member engageable opening 32 towards said receiving opening; and, spring means 50 disposed around the latch member 30 including a first spring 51 biasing the entering latch member 30 to the locking position, a second spring 52 biasing said latch plate 40 so that said cam-like projection 42 engages said engageable opening 32, and a third spring 53 having a spring projection 54 which abuts said cam-like projection. This third spring 53 includes push-button means protruding through the case cover top opening 21 so that by pushing said push-button means the cam-like projection 42 of latch plate 40 will unlock from engageable opening 32 of the latch member 30.

I claim:
1. A buckle device for a safety belt to fasten a car occupant to the vehicle seat or body, comprising in combination:
   (a) a flat latch member (30) fastened at one end to the end of a safety belt and having an engageable opening (32) at the other end;
   (b) a case (10) with a case cover (20) attached to the other end of the safety belt, with a top opening (21) on the front of the case cover and a receiving opening provided on the end disposed to receive said latch member (30);
   (c) a latch plate (40) contained in said case (10) with one plate end (41) rotatably supported by said case and the other end having a cam-like projection (42) for engagement with said latch member engageable opening (32) towards said receiving opening; and
   (d) spring means (50) disposed around said latch member (30) including a first spring (51) biasing said latch member (30) to the locking position, a second spring (52) biasing said latch plate (40) so that said cam-like projection (42) engages said engageable opening (32), and a third spring (53) having a spring projection which abuts said cam-like projection (42) and includes push-button means protruding through said case cover top opening (21) so that by pushing said push-button means said cam-like projection (42) of said latch plate (40) will unlock from said engageable opening (32) of said latch member (30).

2. A device as claimed in claim 1 wherein said spring means (50) has a C-shape in cross-section, said first, second and third springs (51, 52, 53) being integrally connected at the end opposite said spring projection (54), with wing pieces (57) for fastening to the case (10) said case (10) having a case wall (11) with notches (12) therein for receiving said wing pieces 57.

3. A device as claimed in claim 1 wherein said latch member (30) has a pair of outer engaging pieces (31) with inwardly pointing hook like ends for engagement by said latch plate engaging projection (42) said pieces defining a space where said projection (42) can pass through.

4. A device as claimed in claim 1 wherein said latch member (30') has a loop shape with a closed leg portion (31') having an inward tapered face (34) defining an opening (32') for said engaging projection (42) to pass through.

5. A device as claimed in claim 2 wherein said third spring (53) includes a push-bottom integral therewith forming said push-button means.

6. A device as claimed in claim 2 wherein said third spring (53) has a separate push-botton (57') attached thereto as said push-button means.

References Cited
UNITED STATES PATENTS

| | | | |
|---|---|---|---|
| 3,331,108 | 7/1967 | Fisher | 24—230.1UX |
| 3,425,103 | 2/1969 | Melin | 24—230.1UX |
| 3,494,007 | 2/1970 | Dahms | 24—230.1UX |

BERNARD A. GELAK, Primary Examiner

U.S. Cl. X.R.

24—196